United States Patent [19]

Ogoe et al.

[11] Patent Number: 4,626,563
[45] Date of Patent: Dec. 2, 1986

[54] FIRE RETARDANT CARBONATE POLYMER COMPOSITION

[75] Inventors: Samuel A. Ogoe, Angleton; Kevin F. Dick, Lake Jackson, both of Tex.

[73] Assignee: The Dow Chemical Company, Midland, Mich.

[21] Appl. No.: 726,853

[22] Filed: Apr. 24, 1985

Related U.S. Application Data

[63] Continuation-in-part of Ser. No. 550,677, Nov. 10, 1983, abandoned, which is a continuation-in-part of Ser. No. 651,139, Sep. 17, 1984, abandoned.

[51] Int. Cl.$^4$ ................................................. C08K 5/43
[52] U.S. Cl. ................................. 524/168; 524/169; 524/281; 524/419; 524/423
[58] Field of Search ............... 525/147; 524/168, 169, 524/419, 423, 281, 537, 546, 576, 410, 411

[56] References Cited

U.S. PATENT DOCUMENTS

| | | | |
|---|---|---|---|
| 3,005,795 | 10/1961 | Busse et al. | 525/154 |
| 3,294,871 | 12/1966 | Schmitt et al. | 525/146 |
| 3,651,174 | 3/1972 | Bialous | 525/101 |
| 4,208,489 | 6/1980 | Schmidt et al. | 524/94 |
| 4,222,910 | 9/1980 | Tokuda | 525/146 |
| 4,223,100 | 9/1980 | Reinert | 525/146 |
| 4,254,015 | 3/1981 | Thomas et al. | 524/169 |
| 4,366,276 | 12/1982 | Freitag et al. | 524/94 |

*Primary Examiner*—Veronica P. Hoke
*Attorney, Agent, or Firm*—B. G. Colley

[57] ABSTRACT

Flame retardant carbonate polymers containing an aromatic sulfimide, a monomeric or polymeric halogenated organic compound, a metal sulfate having a pka from 1 to 5 and a fibril forming polytetrafluoroethylene as additives in effective amounts give carbonate polymers that are not only flame retardant but are melt stable i.e. show little loss in molecular weight during processing or melt shearing.

9 Claims, No Drawings

FIRE RETARDANT CARBONATE POLYMER COMPOSITION

CROSS-REFERENCE TO RELATED APPLICATION

This application is a continuation-in-part of Ser. No. 550,677 filed Nov. 10, 1983 now abandoned and a continuation-in-part of Ser. No. 651,139 filed Sept. 17, 1984 now abandoned.

BACKGROUND OF THE INVENTION

This invention relates to carbonate polymer compositions containing additives which act as flame retardants together with an additive which improves processing stability.

Carbonate polymers derived from reactions of dihydroxyorganic compounds, particularly the dihydric phenols, and carbonic acid derivatives such as phosgene, have found extensive commercial application because of their excellent physical properties. These thermoplastic polymers are suitable for the manufacture of molded parts wherein impact strength, rigidity, toughness, heat resistance, and excellent electrical properties are required.

Unfortunately, however, these polymers exhibit a brief but definite burning time when contacted with an open flame. More importantly, as is often the case, the carbonate polymers contain stabilizers and other additives which are often more combustible than the unmodified carbonate polymer. As a result, the modified carbonate polymers frequently exhibit substantially poorer resistance to combustion than does the unmodified carbonate polymer.

In attempts to increase the combustion resistance of carbonate polymers including the modified forms thereof, it has been a common practice to employ monomeric phosphites, phosphoric acid esters, thiophosphoric acid esters containing halogenated alkyl radicals and halogenated organic compounds into the carbonate polymer. However, in order to obtain any noticeable improvement in combustion resistance, these additives have been employed in such large quantities that they often adversely affect many of the desirable physical and mechanical properties of the carbonate polymer.

The use of aromatic sulfimides as flame retardants in carbonate polymers is suggested in U.S. Pat. No. 4,254,015 dated 3-3-81. However, it was found that while these additives are efficient as flame retardants they also adversely affect the processing stability of the carbonate polymers. In other words, during melt processing such as extruding into pellets there is a considerable lowering of the molecular weight.

The use of metal salts of inorganic acids such as sodium bisulfate as flame retardants is suggested in U.S. Pat. No. 4,486,560. However, this patent does not suggest the use of these compounds as processing aids.

The use of a metal salt of aromatic sulfonamides and a metal sulfate or bisulfate to provide flame retardant polycarbonates is disclosed in U.S. Pat. No. 4,532,284. However, this patent does not suggest the use of halogenated organic compounds and polytetrafluoroethylene and hence the polycarbonates prepared therein are not as flame retardant as is desired.

SUMMARY OF THE INVENTION

The present invention is a carbonate polymer composition comprising a carbonate polymer having dispersed therein, a fire retardant additive comprising a metal salt of an aromatic sulfimide, a monomeric or polymeric halogenated organic compound, a metal sulfate or bisulfate having a pka from 1 to 5 inclusive, and a polytetrafluoroethylene of the fibril forming type. Hereinafter, such compositions will be referred to as fire retardant carbonate polymer compositions and they exhibit surprisingly high resistance to combustion. In addition, said compositions exhibit physical properties comparable to a carbonate polymer containing no fire retardant additive.

The fire retardant carbonate polymer compositions of the present invention are suitably employed in most applications in which opaque polycarbonates have been previously utilized. Applications of particular interest for the utilization of the said carbonate polymer compositions of this invention are pigmented and/or colored carbonate polymers useful as: automobile parts, e.g., air filters, fan housings, exterior components, housings for electrical motors, appliances, business and office equipment, photographic equipment, and aircraft applications.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,036, 3,036,037, 3,036,038 and 3,036,039, polycarbonates of bis(ar-hydroxyphenyl)-alkylidenes (often called bisphenol-A type diols) including their aromatically and aliphatically substituted derivatives such as disclosed in U.S. Pat. Nos. 2,999,835, 3,038,365 and 3,334,154, and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121, 4,287,787, 4,156,069, 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The salt form of aromatic sulfimides which are employed herein are advantageously represented by the formula:

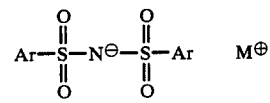

wherein Ar is an aromatic or substituted aromatic group, M is a suitable cation such as a metal cation. M is preferably an alkali metal such as sodium or potassium. Alternatively, M is a divalent cation, preferably alkaline earth or multivalent cation obtained from copper, aluminum, antimony, and the like. Representative preferred sulfimide salts include the alkali metal salts of saccharin, N-(p-tolylsulfonyl)-p-toluenesulfimide, N-(N'-benzylaminocarbonyl)sulfanilimide, N-(phenylcarboxyl)-sulfanilimide, N-(2-pyrimidinyl)-sulfanilimide, N-(2-thiazolyl)sulfanilimide and other salts of the sulfimides disclosed in U.S. Pat. No. 4,254,015, which is incorporated herein by reference. Combinations of the above-identified salts can also be employed.

Useful monomeric bromo and/or chloro halogenated aromatic compounds are halogenated diphenyl sulfone, diphenyl, diphenyl oxide, benzene, phthalimide, and mixtures thereof. These compounds can be mono or poly halogenated with bromine or chlorine atoms. Bromine compounds are preferred since they cause less degradation of the polycarbonate and appear to be more efficient as flame retardants.

Useful polymeric bromo and/or chloro halogenated aromatic compounds are oligomeric and polymeric polycarbonates derived from phosgene and a halogenated bisphenol A with or without bisphenol A. Thus, homopolymers and copolymers are useful in this invention.

Useful melt stabilizing additives are metal bisulfates or sulfates having a pka from 1 to 5 and preferably 1 to 3. Examples of useful metal bisulfates or sulfates are sodium bisulfate, potassium bisulfate, lithium bisulfate, rubidium bisulfate, cesium bisulfate, and aluminum sulfate.

Useful melt stabilizing additives of the polymeric type are fibril forming polytetrafluoroethylenes. These polymers are commercially available and they are shown in U.S. Pat. No. 3,005,795 and 3,671,487.

The fire retardant carbonate polymer compositions of the present invention are suitably prepared by combining the carbonate polymer with an effective amount of the additives using any of a variety of blending procedures conventionally employed for incorporating additives into carbonate polymer resins. For example, dry particulates of the carbonate polymer and the additives can be dry blended and the resulting dry blend extruded into the desired shape. By "effective amount" is meant that combination of the desired additive components that is sufficient to provide improved fire retardant character and processing stability to the carbonate polymer with which it is blended.

While any amount of the metal salt fire retardant additive that imparts to the carbonate polymer an improved fire retardancy is suitable, preferred amounts of the fire retardant additive are in the range from about 0.001 to about 2 percent, especially from about 0.001 to about 1.0 weight percent based on the weight of the carbonate polymer.

The amount of the halogenated organic compound used herein is not critical provided that the final halogen content of the polymer composition is in the range from about 0.01 to 10 percent by weight and preferably from about 0.1 to about 1.0 percent by weight. It is to be understood that one can use relatively small amounts of a highly halogenated aromatic compound or a relatively large amount of a sparsely halogenated compound to achieve the above desired ranges.

The amount of the metal sulfate or bisulfate used to provide increased melt stability can be any amount that is suitable. Preferably, an amount from about 0.001 to about 2.0 percent by weight based on the carbonate polymer will be suitable. The most preferred range is from about 0.01 to about 0.5 percent by weight.

The amount of the fibril forming polytetrafluoroethylene used to melt stabilize the polymers of this invention is in the range from about 0.01 to about 10 percent and preferably in the range from about 0.1 to about 5 percent by weight.

In addition to the aforementioned fire retardant additives, other additives can be included in the carbonate polymer composition of the present invention such as fillers (i.e., glass fibers), pigments, dyes, antioxidants, heat stabilizers, ultraviolet light absorbers, mold release agents and other additives commonly employed in carbonate polymer compositions.

The following examples are given to further illustrate the invention and should not be construed as limiting its scope. In the following examples, all parts and percentages are by weight unless otherwise indicated.

EXAMPLE 1

A polycarbonate formulation containing 0.06% by weight of potassium paratolylsulfimide (KpTSM), 0.05% by weight potassium bisulfate (KHSO$_4$), 6% by weight of a tetrabromobisphenol A, bisphenol A polycarbonate having a molecular weight of 27,000 (TBBPA/BPA) and having 5% by weight of bromine and 0.3% by weight of fibril forming polytetrafluoroethylene (PTFE) was prepared by mixing a Bis A polycarbonate extrudate having a molecular weight of about 31,000 with the additives for about 45 minutes on a Hobart mixer. The final polycarbonate thus had a bromine content of 0.3% by weight. The formulated sample was dried for 3 hours at 125° C. (257° F.). The dried sample was extruded into pellets at 302° C. (575° F.). The extruded pellets were redried in a forced draft oven for 3 hours at 125° C. (257° F.). A sample of the pellets was injection molded at 302° C. (575° F.) into 1.6 mm (1/16 inch) bars for flammability tests using the UL-94 test procedure.

EXAMPLE 2

The procedure of Example 1 was repeated using 0.5% PTFE.

EXAMPLE 3

The procedure of Example 1 was repeated using 1.0% PTFE.

Control 1

The procedure of Example 1 was repeated using no KPTSM, TBBPA/BPA, KHSO$_4$, or PTFE. This is designated polymer A hereinafter.

Control 2

The procedure of Example 1 was repeated using only 0.5% weight percent PTFE.

Control 3

The procedure of Example 1 was repeated using no KHSO$_4$ or PTFE.

Control 4

The procedure of Example 1 was repeated using no PTFE.

All the controls and the examples contained 0.1% by weight of a diphosphonite stabilizer "P-EPQ" from Sandoz (U.S. Pat. No. 3,825,629) and 0.05% by weight of a hindered phenolic stabilizer "Irganox 1076" from Geigy Chemical Corporation (U.S. Pat. No. 3,330,859) as heat stabilizers.

Table I shows that addition of 0.3 to 1% polytetrafluoroethylene (PTFE) to the heat stabilized polycarbonate containing the described levels of potassium paratolylsulfimide (KPTSM) combined with tetrabromobisphenol-A/bisphenol-A copolymer (TBBPA/BPA) and potassium bisulfate ($KHSO_4$) does improve the flammability properties and retard the polymer's tendency to drip. The table clearly demonstrates the synergism among the above ingredients to produce superior non-dripping 1/16 inch modified flammability polycarbonate products.

TABLE I
FLAMMABILITY TEST RESULTS

| Sample | | $\Sigma T_1$ Sec* | $\Sigma T_2$ Sec* | Avg. T Sec | No. Drips | Rating |
|---|---|---|---|---|---|---|
| Control 1. | Heat stabilized polymer (A) | 45 | 50 | 9.5 | 5/5 | V-2 |
| Control 2. | (A) + 0.5% PTFE | 6.7 | 55 | 6.2 | 2/5 | V-2 |
| Control 3. | (A) + 0.06% KPTSM + 6.0% TBBPA/BPA | 15.1 | 19.2 | 3.4 | 5/5 | V-2 |
| Control 4. | (A) + 0.06% KPTSM + 6.0% TBBPA/BPA + 0.05% $KHSO_4$ | 12.0 | 18.0 | 3.0 | 5/5 | V-2 |
| Example 1. | (A) + 0.06% KPTSM + 6.0% TBBPA/BPA + 0.05% $KHSO_4$ + 0.3% PTFE | 5.0 | 5.2 | 1.0 | 0/5 | V-0 |
| Example 2. | (A) + 0.06% KPTSM + 6.0% TBBPA/BPA + 0.05% $KHSO_4$ + 0.5% PTFE | 5.1 | 5.1 | 1.0 | 0/5 | V-0 |
| Example 3. | (A) + 0.06% KPTSM + 6.0% TBBPA/BPA + 0.05% $KHSO_4$ + 1.0% PTFE | 3.6 | 3.6 | 0.7 | 0/5 | V-0 |

*Total flame times in seconds for 5 samples.

EXAMPLE 4

Following the procedure of Example 1, a 40 gram sample of dried pellets were prepared and subjected to melt shearing at 282° C. (540° F.) in a torque rheometer made by Haake (model number EU-5V). Molecular weight by size exclusion chromotography was measured and compared to the original sample. The results are set forth in Table II hereinafter. By this test, it can be deduced that the greater the drop in molecular weight, the less stable the polymer is to melt processing.

EXAMPLE 5

Example 4 was repeated using the pellets of Example 2.

EXAMPLE 6

Example 4 was repeated using the pellets of Example 3.

Control 5

Example 4 was repeated without the KPTSM, TBBPA/BPA, $KHSO_4$ or PTFE.

Control 6

Example 4 was repeated using 0.5% by weight of PTFE alone.

Control 7

Example 4 was repeated using no $KHSO_4$ or PTFE.

Control 8

Example 4 was repeated using no PTFE.

TABLE II

| | | Molecular Weight (Mw) | | |
|---|---|---|---|---|
| Sample | | Initial* | Final** | Δ Mw |
| Control 5. | Heat stabilized polymer (A) | 27,100 | 25,200 | 1,900 |
| Control 6. | (A) + 0.5% PTFE | 26,200 | 24,100 | 2,100 |
| Control 7. | (A) + 0.06% KPTSM + 6.0% TBBPA/BPA | 27,700 | 22,700 | 5,000 |
| Control 8. | (A) + 0.06% KPTSM + 6.0% TBBPA/BPA + 0.05% $KHSO_4$ | 27,300 | 25,200 | 2,100 |
| Example 4. | (A) + 0.06% KPTSM + 6% TBBPA/BPA + 0.05% $KHSO_4$ + 0.3% PTFE | 26,500 | 24,600 | 1,900 |
| Example 5. | (A) + 0.06% KPTSM + 6.0% TBBPA/BPA + 0.05% $KHSO_4$ + 0.5% PTFE | 26,500 | 24,700 | 1,800 |
| Example 6. | (A) + 0.06% KPTSM + 6.0% TBBPA/BPA + 0.05% $KHSO_4$ + 1.0% PTFE | 25,500 | 24,800 | 700 |

*After adding the fire retardant additives and extruding.
**After melt shearing at 282° C. in a torque rheometer for 30 minutes.

Table II shows the synergistic effect of the potassium paratolylsulfimide, tetrabromobisphenol-A/bisphenol-A copolymer, potassium bisulfate and polytetrafluoroethylene additives combination to provide better melt processing stability than the potassium paratolylsulfimide and tetrabromobisphenol-A combination.

Controls 9–10

Examples 1-3 were repeated using a non-fibril forming polytetrafluoroethylene (Witcon 368 sold by ICI Americas). As can be seen by Table III hereinafter the number of drips was excessive and resulted in a V-2 rating for all the samples.

TABLE III
Flammability Test Results Using Non-Fibril Forming PTFE (NF-PTFE)

| Sample | | $\Sigma T_1$ Sec* | $\Sigma T_2$ Sec* | Avg. T Sec | No. Drips | Rating |
|---|---|---|---|---|---|---|
| Control 9. | (A) + 0.06% KPTSM + 6.0% TBBPA/BPA + 0.05% $KHSO_4$ + 0.3% NF-PTFE | 11.5 | 18.6 | 3.0 | 2/5 | V-2 |
| Control 10. | (A) + 0.06% KPTSM + 6.0% TBBPA/BPA + 0.05% $KHSO_4$ + 0.5% NF-PTFE | 14.2 | 15.5 | 3.0 | 4/5 | V-2 |
| Control 11. | (A) + 0.06% KPTSM + 6.0% TBBPA/BPA + 0.05% $KHSO_4$ + 1.0% NF-PTFE | 20.3 | 26.8 | 4.7 | 5/5 | V-2 |

*Total flame times in seconds for 5 samples.

EXAMPLE 7

The procedure of Example 1 was repeated to prepare a polycarbonate formulation containing 0.06% by weight of potassium paratolylsulfimide (KPTSM), 0.05% by weight of potassium bisulfate, 0.6% by weight of a tetrabromo bisphenol A carbonate oligomer (TBBPA) having a bromine content of about 52% and 4 to 5 monomer units (Great Lakes Chemical BC-52), 0.3% by weight of a fibril forming polytetrafluoroethylene (FF-PTFE) and 1.0% of titanium dioxide. The final white polycarbonate formulation had a bromine content of 0.3% by weight.

The formulation was molded into 1.6 mm (1/16 inch) bars and tested according to the UL-94 test procedure. The results are given in Table IV.

TABLE IV

| Sample | | UL-94 Test at 1/16" | | | | |
|---|---|---|---|---|---|---|
| | | $\Sigma T_1$ Sec* | $\Sigma T_2$ Sec* | Avg. T Sec | No. Drips | Rating |
| Example 7. | Polymer A + 0.06% KPTSM + 0.6% TBBPA + 0.3% FF-PTFE + 1.0% TiO$_2$ | 4.4 | 4.6 | 0.9 | 0 | V-0 |

*Total flame times in seconds for 5 samples.

We claim:

1. A flame retardant polymer composition comprising an aromatic carbonate polymer having dispersed therein
   (A) from 0.001 to 2% by weight of a metal salt of an aromatic sulfimide,
   (B) from 0.01 to 10% by weight of a monomeric or polymeric bromo and/or chloro halogenated aromatic compound,
   (C) from 0.001 to 2% by weight of a metal salt of an inorganic acid having a pka from 1 to 5, and
   (D) from 0.01 to 10% by weight of fibril forming polytetrafluoroethylene.

2. The polymer composition of claim 1 wherein
   (A) the amount of said sulfimide is in the range from 0.01 to 1.0% by weight based on said polymer composition,
   (B) the amount of said halogenated aromatic compound is such that the final aromatic-halogen content in said polymer composition is in the range from 0.1 to 1.0% by weight,
   (C) the amount of said metal salt is in the range from 0.01 to 0.5% by weight, and
   (D) the amount of said polytetrafluoroethylene is in the range from 0.1 to 5% by weight.

3. A flame retardant polymer composition comprising an aromatic carbonate polymer having dispersed therein
   (A) from 0.001 to 2% by weight of a metal salt of an aromatic sulfimide,
   (B) from 0.01 to 10% by weight of a polybrominated polycarbonate,
   (C) from 0.001 to 2% by weight of a metal salt of an inorganic acid having a pka from 1 to 5, and
   (D) from 0.01 to 10% by weight of fibril forming polytetrafluoroethylene.

4. The composition of claim 3 wherein said sulfimide salt is potassium paratolylsulfimide.

5. The composition of claim 3 wherein said metal salt is potassium bisulfate.

6. The composition of claim 3 wherein said brominated polycarbonate is a copolycarbonate of bisphenol A and tetrabromobisphenol A.

7. The composition of claim 3 wherein said brominated polycarbonate is a homopolycarbonate of tetrabromobisphenol A.

8. The polymer composition of claim 3 wherein
   (A) the amount of said sulfimide is in the range from 0.001 to 2% by weight based on said polymer composition,
   (B) the amount of said halogenated aromatic compound is such that the final aromatic-halogen content in said polymer composition is in the range from 0.01 to 10% by weight,
   (C) the amount of said metal salt is in the range from 0.001 to 2% by weight, and
   (D) the amount of said polytetrafluoroethylene is in the range from 0.01 to 10% by weight.

9. The polymer composition of claim 3 wherein
   (A) the amount of said sulfimide is in the range from 0.01 to 1.0% by weight based on said polymer composition,
   (B) the amount of said halogenated aromatic compound is such that the final aromatic-halogen content in said polymer composition is in the range from 0.1 to 1.0% by weight,
   (C) the amount of said metal salt is in the range from 0.01 to 0.5% by weight, and
   (D) the amount of said polytetrafluoroethylene is in the range from 0.1 to 5% by weight.

* * * * *